United States Patent Office 3,299,998
Patented Jan. 24, 1967

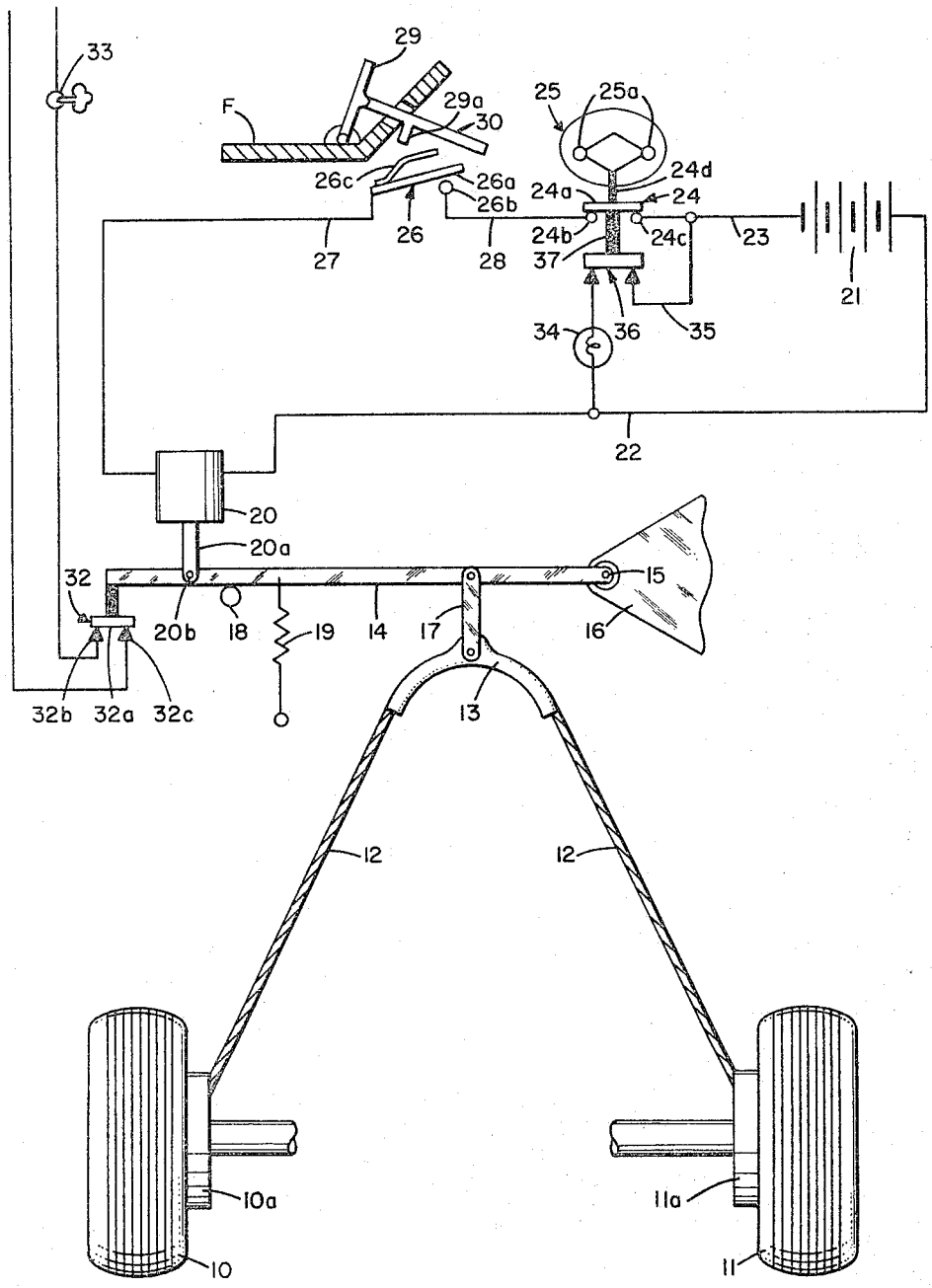

3,299,998
ACCELERATOR AND SPEED CONTROLLED BRAKE
Arnold J. Douberly, 3945 Elcam Blvd. SE.,
St. Petersburg, Fla. 33705
Filed Oct. 30, 1964, Ser. No. 407,759
3 Claims. (Cl. 192—3)

The present invention relates to means for automatically applying emergency brakes of an automotive vehicle under certain operating conditions, and more particularly to a system in which emergency brakes are automatically applied to a vehicle in the event the engine accelerator pedal is inadvertently depressed to fully open the throttle while the vehicle is standing or moving at a relatively slow speed.

A large number of motor vehicles now employ automatic transmissions and to place the vehicle in motion it is merely necessary to depress the accelerator whereupon the vehicle is placed in motion and the transmission moves from low to high gear automatically. Experience has proven that for this reason many serious accidents have occurred, particularly in close traffic conditions, by the driver becoming confused and depressing the accelerator pedal rather than the foot brake and frequently when such situations arise the driver is "frozen" with his foot depressing the accelerator so that the full power of the vehicle is engaged, driving the vehicle into obstructions resulting in considerable damage and frequently serious or fatal injuries. It has been observed that many such accidents occur while the vehicle is stopped or moving at a low speed, such as stopping for traffic, or parking the vehicle in close quarters.

It is an object of the present invention therefore to provide a safety system which is operative to apply the emergency brakes of a motor vehicle and bring it to a stop in the event the accelerator pedal is depressed to a substantially full open throttle position while the vehicle is standing still or moving at a low speed which would not warrant a full throttle action.

In carrying out the invention, an electroresponsive power means is provided for actuating an emergency brake system of a vehicle, which means is controlled by a power circuit including a vehicle speed responsive switch normally closed below a given relatively low speed of the vehicle, and a second switch which is normally opened but which is closed when the accelerator pedal is depressed to open the engine throttle. Preferably, a pilot light is controlled by the speed responsive switch to indicate to the operator that the emergency equipment is in operative condition when the speed of the car is below the given value. Furthermore, the invention contemplates the opening of the ignition circuit for the engine by a normally closed switch which is opened by operation of the emergency brake applying means so that the driving power is terminated at the time the brakes are applied.

Other objects and advantages of the invention will be apparent from the following description of a preferred form thereof, reference being made to the accompanying drawings wherein a schematic showing of an automotive vehicle embodying the invention is illustrated.

Referring to the drawing, the rear wheels of a conventional automatic transmission type automobile are shown at 10 and 11, and each wheel is provided with an emergency brake 10a and 11a, respectively, which includes emergency brake shoes which are actuated to lock the wheels against rotation by the forward movement of a cable 12. Brakes of this type are well known in the art and no further description thereof is deemed necessary to an understanding of the invention. Cable 12 is secured over a yoke 13 which is arranged to be pulled forwardly, as viewed in the drawings, by operation of a lever 14 which is pivoted at 15 to the frame 16 of the automobile, the lever being connected to the yoke by a link 17 pivotally connected to the lever and yoke.

Lever 14 is normally urged against a stop 18 on the frame of the vehicle by a spring 19, the lower end of which is attached to a suitable part of the frame of the vehicle, not shown, and the upper end of which is attached to lever 14.

Lever 14 is drawn to a raised position to apply brakes 10a and 11a by an electroresponsive means such as a solenoid 20 which includes an armature 20a, pivotally connected with the lever at 20b.

The circuit for solenoid 20 includes a suitable battery 21, one terminal of which is connected to one lead of the solenoid by a wire 22 and the other terminal of which battery is connected to the other lead of the solenoid through a wire 23, switch 24, wire 28, switch 26 and wire 27.

Switch 24 includes a contact bar 24a which is arranged to bridge fixed contacts 24b and 24c and is connected by an operating rod 24d to a speed responsive actuator mechanism 25, which is shown diagrammatically as a centrifugal governor type comprising revolving weights 25a which are connected to the running gear of the vehicle in a convenient manner, not shown, and rotate at a rate proportional to the ground speed of the vehicle. At a predetermined rate of rotation the weights 25a lift contact member 24a from the fixed contacts 24b and 24c to open the circuit, and below that predetermined rate the weights drop to lower the contact bar to engage the fixed contacts. Speed responsive switches are well known in the art and further description thereof is unnecessary and it is to be understood that any suitable speed responsive mechanism could be used to operate the switch. Preferably, switch 24 is normally closed at speeds below 15 m.p.h. and opened above that speed, although any other desirable speed limit could be utilized.

Switch 26 comprises a spring switch arm 26a which is normally biased upwardly from a fixed contact 26b and is arranged to be depressed and closed on the fixed contact when the accelerator pedal 29 of the vehicle is fully depressed. For this purpose, a spring leaf 26c is attached to contact 26a and one end projects into the path of a lug 29a which extends from the accelerator rod 30 of the vehicle, which rod interconnects pedal 29 and the carburetor of the engine, not shown, and regulates the engine throttle in the usual manner. As rod 30 is depressed toward the right by the accelerator pedal 29, the speed of the engine is increased. As shown, accelerator pedal 29 is pivoted to the floor board F of the automobile, and spring means, not shown, normally urges the accelerator pedal to the life as viewed in the drawing, and when the accelerator pedal is depressed to near its wide open throttle position lug 29a engages spring 26c to close switch 26.

From the foregoing it will be seen that in the event the vehicle is standing still or moving at speeds below 15 m.p.h. and accelerator pedal 29 is depressed to the full open throttle position or thereabout, a circuit is completed for energizing solenoid 20 so that brakes 10a and 11a are applied through lever 14 and cable 12.

It is desirable to stop the engine when the brakes are applied and this is accomplished by providing a switch 32 in the ignition circuit in series with the conventional ignition control switch 33 on the dashboard of the vehicle. Switch 32 includes a contact 32a carried by lever 14 and which engages fixed contacts 32b and 32c during the time lever 14 is against stop 18. When lever 14 moves from stop 18 to apply the emergency brakes, contact 32a is removed from fixed contacts 32b and 32c to open the ignition circuit and stop the engine.

Preferably, a pilot light 34 is conveniently positioned on the dashboard of the car, not shown, and will light at speeds below 15 m.p.h. to indicate that the system is in condition for operation and that the accelerator pedal should not be intentionally fully depressed. The circuit for lamp 34 includes battery 21, wires 23, 35, a switch 36, which is attached to contact 24a by an insulating connection 37 and is operated with speed responsive switch 24 so that when switch 24 is open switch 36 is likewise open.

It will be apparent that in the event the operator of the vehicle depresses the accelerator pedal to the open throttle position when the vehicle is stopped or moving at a low rate of speed, the emergency brakes will be applied and the engine stopped. As soon as the accelerator pedal is released, switch 26 opens and the emergency brakes are released by de-energization of the circuit for solenoid 20. Thus, any danger of inadvertent or panic depression of the accelerator pedal in close quarters which would require slow driving is eliminated. On the other hand, light 34 warns the driver not to fully depress the accelerator pedal under conditions where braking is undesired.

Although but one form of the invention has been shown it is apparent that other forms, modifications, and adaptations could be made, all falling within the scope of the claims which follow.

I claim:

1. A control system for an engine driven vehicle having a throttle controlling member movable through a range of movement including a substantially fully open throttle position at one end of said range of movement for controlling the throttle of said engine, safety means for stopping said vehicle, control means for said safety means responsive to movement of said throttle controlling member substantially to said full open throttle position for actuating said safety means for stopping said vehicle, said control means being inoperative to actuate said safety means during movement of said throttle controlling member throughout the remainder of said range of movement thereof, and means responsive to a predetermined relatively low speed of said vehicle for rendering said control means inoperative to actuate said safety means.

2. A control system for an automotive vehicle as defined in claim 1 further characterized by said safety means comprising electroresponsive means, and said control means comprising an electrical circuit for said electroresponsive means and including in series circuit a first switch responsive to the speed of said vehicle to close and open below and above said relatively slow speed respectively, and a second switch in series circuit with said first switch and moved to close circuit position in response to movement of said throttle controlling member to said full open position and moved to opened circuit position when said throttle controlling member is moved from said full open throttle position.

3. A control system for an automotive vehicle as defined in claim 2 further characterized by said safety means comprising a vehicle brake system, and said electroresponsive means comprising an electromagnetically operated brake applying means.

References Cited by the Examiner

UNITED STATES PATENTS

| 1,512,167 | 10/1924 | Gore. | |
|-----------|---------|-------|-------|
| 1,727,384 | 9/1929 | Thomas | 192—3 |
| 2,236,145 | 3/1941 | Kolb. | |
| 2,319,746 | 5/1943 | Orr | 192—3 |
| 2,516,904 | 8/1950 | Oetzel | 192—3 |
| 2,876,876 | 3/1959 | Cummins | 192—3 |
| 2,978,080 | 4/1961 | Beatty | 192—3 |

DAVID J. WILLIAMOWSKY, *Primary Examiner.*

BENJAMIN W. WYCHE III, *Examiner.*